United States Patent [19]
Yoshino

[11] Patent Number: 5,519,082
[45] Date of Patent: May 21, 1996

[54] CURABLE SILICONE RUBBER COMPOSITION AND METHOD FOR PREPARING SILICONE RUBBER

[75] Inventor: Masachika Yoshino, Usui, Japan

[73] Assignee: Shin-Etsu Chemical Co., Ltd., Tokyo, Japan

[21] Appl. No.: 420,504

[22] Filed: Apr. 12, 1995

[30] Foreign Application Priority Data

Apr. 13, 1994  [JP]  Japan .................................. 6-099287

[51] Int. Cl.$^6$ .................................................. C08K 3/34
[52] U.S. Cl. ........................... 524/493; 524/862; 524/847; 528/15
[58] Field of Search ........................... 524/493, 862, 524/847; 528/15

[56] References Cited

U.S. PATENT DOCUMENTS 5,366,809  11/1994  Schmidt et al. ...................... 428/447

*Primary Examiner*—Melvyn I. Marquis
*Attorney, Agent, or Firm*—Millen, White, Zelano, & Branigan

[57] ABSTRACT

A curable silicone rubber composition contains (A) an organopolysiloxane raw rubber containing 0.01–1% by weight of vinyl and having a viscosity of $10^3$–$10^6$ poise at 25° C., (B) an organopolysiloxane oil containing 0.1–10% by weight of vinyl and having a viscosity of 0.05–100 poise at 25° C., (C) an organopolysiloxane copolymer composed mainly of a triorganosiloxy unit (M) and $SiO_2$ unit (Q) in a molar ratio (M/Q) between 0.6 and 1.2 and containing 0.1–10% by weight of vinyl, (D) an organohydrogensiloxane containing at least three silylidyne groups, (E) a platinum catalyst, and (F) finely divided silica as essential components. The composition is hot air vulcanizable into a silicone rubber which is improved in hardness, modulus, tear strength and compression set.

20 Claims, No Drawings

CURABLE SILICONE RUBBER COMPOSITION AND METHOD FOR PREPARING SILICONE RUBBER

TECHNICAL FIELD

This invention relates to a curable silicone rubber composition of the addition curing type curing into a silicone rubber having high hardness, high modulus, improved tear strength and improved compression set. It also relates to a method for preparing such silicone rubber.

BACKGROUND

Silicone rubber has been used in a variety of fields as medical instruments, building materials, electric and electronic parts, automotive parts, and business machine parts because of its superior properties including physiological inertness (non-toxicity), weather resistance, durability, release properties, and heat resistance.

Various curing types of silicone rubber are available. Among them, a silicone rubber composition that cures through hydrosilylation reaction is known as the addition curing type. It readily cures simply by heating, leading to a very high production yield. Curing reaction entails no by-products. It is then especially useful for the production of medical tubes and building gaskets by extrusion molding.

In such applications of silicone rubber as very thin tubes and glass-supporting gaskets, the silicone rubber is required to have high hardness and high modulus, typically a hardness of at least 60 on JIS A hardness scale and a 50% modulus of at least 10 kgf/cm$^2$. Such requirements can be met by one conventional approach of adding a relatively large amount of silica filler to a silicone rubber composition.

Although blending a relatively large amount of silica filler in a curable silicone rubber composition affords a silicone rubber composition having improved physical properties, the composition can be extruded with difficulty, detracting from the economy of extrusion molding. Blending of an extra amount of silica filler enhances the hardness and modulus of cured silicone rubber, but rather detracts from other physical properties, especially tear strength and compression set.

Japanese Patent Publication (JP-B) No. 18419/1972 discloses a silicone rubber composition comprising two types of organopolysiloxane having different viscosities and vinyl contents, silica, organohydrogenpolysiloxane, and a platinum catalyst, the composition yielding a silicone rubber having improved tear strength. Carrying out a follow-up test, we found that this silicone rubber had improved tear strength, but was insufficient in compression set and extrudability and had a low modulus. Japanese Patent Application Kokai (JP-A) No. 283265/1992 discloses a silicone rubber composition comprising a vinyl-containing organopolysiloxane and an organopolysiloxane resin copolymer having different viscosities, filler, an organic peroxide, and organohydrogenpolysiloxane, the composition yielding a silicone rubber having improved tear strengths and compression set. Since this silicone rubber composition is essentially vulcanized with organic peroxides, it can afford good tear strength and compression set when compression molded, but is not suitable for extrusion molding, for example, hot air vulcanization (HAV). If a low temperature decomposable organic peroxide is used to allow for HAV, the resulting silicone rubber is drastically reduced in tear strength and compression set. If a high temperature decomposable organic peroxide is used, the resulting silicone rubber composition is prone to compression molding to achieve acceptable tear strength and compression set, but not to HAV.

DISCLOSURE OF THE INVENTION

An object of the present invention is to provide a curable silicone rubber composition which is smoothly extrudable and susceptible to HAV to afford a silicone rubber having excellent hardness, modulus, tear strength and compression set. Another object of the present invention is to provide a method for preparing the silicone rubber.

According to the present invention, there is provided a curable silicone rubber composition comprising as essential components, (A) 100 parts by weight of a first organopolysiloxane containing 0.001 to 1% by weight of a vinyl group and having a viscosity of 1,000 to 1,000,000 poise at 25° C., (B) 5 to 50 parts by weight of a second organopolysiloxane containing 0.1 to 10% by weight of a vinyl group and having a viscosity of 0.05 to 100 poise at 25° C., (C) 5 to 50 parts by weight of an organopolysiloxane copolymer mainly comprising a triorganosiloxy unit (M) of the general formula (1):

$$R^1{}_3SiO_{1/2} \qquad (1)$$

wherein $R^1$ is selected from the group consisting of a vinyl group, a phenyl group, an alkyl group having 1 to 8 carbon atoms, and a fluoroalkyl group having 3 to 10 carbon atoms and a SiO$_2$ unit (Q) in a molar ratio (M/Q) between 0.6 and 1.2 and containing 0.1 to 10% by weight of a vinyl group, (D) an organohydrogensiloxane containing at least three hydrogen atoms each directly attached to a silicon atom in a molecule in an amount to provide 0.5 to 10 mol of the silicon atom-attached hydrogen atom per mol of the vinyl groups in components (A), (B) and (C) combined, (E) a catalytic amount of a platinum catalyst, and (F) 10 to 150 parts by weight of finely divided silica having a specific surface area of at least 50 m$^2$/g.

By using a raw rubber in the form of a vinyl-containing organopolysiloxane (A), adding thereto a vinyl-containing silicone oil (B), a vinyl-containing silicone resin (C), a cross-linking agent (D), and a curing catalyst (E), and further blending a silica filler (F), there is obtained a curable silicone rubber composition which is smoothly dischargeable and susceptible to HAV to yield a silicone rubber having high hardness, high modulus, excellent tear strength and excellent compression set. Preferably, the cured silicone rubber has a hardness of at least 60 on JIS A hardness scale, a 50% modulus of at least 10 kgf/cm$^2$, a tear strength of at least 15 kgf/cm, and a compression set of up to 15% when compressed at 100° C. for 22 hours.

The present invention also provides a method for preparing a silicone rubber by curing the curable silicone rubber composition defined above by hot air vulcanization (HAV).

BEST MODE FOR CARRYING OUT THE INVENTION

The curable silicone rubber composition of the present invention contains components (A) to (F) as essential components.

Component (A) is a (first) organopolysiloxane having a viscosity of 1,000 to 1,000,000 poise at 25° C., preferably 10,000 to 1,000,000 poise at 25° C. The organopolysiloxane contains organic groups each directly attached to a silicon atom, and among the organic groups, it contains 0.001 to 1%, preferably 0.002 to 0.2% by weight of a vinyl group. The preferred organic groups other than vinyl are substituted or unsubstituted monovalent hydrocarbon groups having 1 to 10 carbon atoms and free of an aliphatic unsaturated group, for example, methyl, phenyl, and 3,3,3 -trifluoropropyl groups, with the methyl being most preferred.

Typical examples of the first organopolysiloxane are preferably those having a linear structure blocked with triorganosilyl groups at both ends. Particularly, the organopolysiloxane preferably has the following general formula (2).

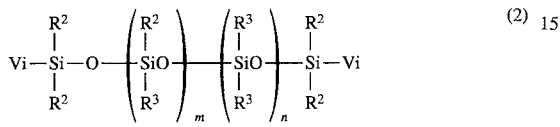

In formula (2), Vi is vinyl; $R^2$ is a substituted or unsubstituted monovalent hydrocarbon group having 1 to 10 carbon atoms, preferably vinyl, phenyl, alkyl having 1 to 8 carbon atoms, and fluoroalkyl having 3 to 10 carbon atoms; and $R^3$ is a substituted or unsubstituted monovalent hydrocarbon group having 1 to 8 carbon atoms and free of an aliphatic unsaturated group, preferably phenyl, alkyl having 1 to 8 carbon atoms, and fluoro- alkyl having 3 to 10 carbon atoms. Examples of the alkyl having 1 to 8 carbon atoms include methyl, ethyl and propyl groups. A typical example of the fluoroalkyl having 3 to 10 carbon atoms is 3,3,3-trifluoropropyl. More preferably, $R^2$ is methyl or vinyl and $R^3$ is methyl. Letters m and n are numbers such that the organopolysiloxane of formula (2) may have a viscosity of 1,000 to 1,000,000 poise at 25° C. and a vinyl content of 0.01 to 1% by weight.

Component (B) is a (second) organopolysiloxane having a viscosity of 0.05 to 100 poise at 25° C., preferably 0.1 to 50 poise at 25° C. The organopolysiloxane contains organic groups each directly attached to a silicon atom, and among the organic groups, it contains 0.1 to 10%, preferably 0.15 to 1% by weight of a vinyl group. The preferred organic groups other than vinyl are substituted or unsubstituted monovalent hydrocarbon groups having 1 to 10 carbon atoms and free of an aliphatic unsaturated group, preferably methyl.

Typical examples of the second organopolysiloxane are those represented by the following general formula (3).

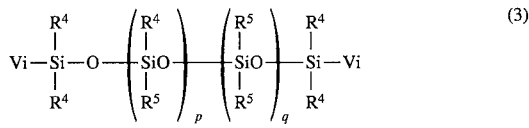

In formula (3), Vi is vinyl; $R^4$ is a substituted or unsubstituted monovalent hydrocarbon group having 1 to 10 carbon atoms, preferably vinyl, phenyl, alkyl having 1 to 8 carbon atoms, and fluoroalkyl having 3 to 10 carbon atoms; and $R^5$ is a substituted or unsubstituted monovalent hydrocarbon group having 1 to 8 carbon atoms and free of an aliphatic unsaturated group, preferably phenyl, alkyl having 1 to 8 carbon atoms, and fluoroalkyl having 3 to 10 carbon atoms. Examples of the alkyl having 1 to 8 carbon atoms include methyl, ethyl and propyl groups. A typical example of the fluoroalkyl having 3 to 10 carbon atoms is 3,3,3-trifluoropropyl. More preferably, $R^4$ is methyl or vinyl and $R^5$ is methyl. Letters p and q are numbers such that the organopolysiloxane of formula (3) may have a viscosity of 0.05 to 100 poise at 25° C. and a vinyl content of 0.1 to 10% by weight.

Component (B) is blended in an amount of 5 to 50 parts, preferably 7 to 40 parts by weight per 100 parts by weight of component (A). A composition containing less than 5 parts of component (B) on this basis is too hard prior to curing and less efficient to extrusion mold whereas with more than 50 parts of component (B), a cured rubber is low in elongation.

Component (C) is a vinyl-containing organopolysiloxane copolymer comprising a triorganosiloxy unit (M) of the following general formula (1) and a $SiO_2$ unit (Q) as main units.

$$R^1_3SiO_{1/2} \quad (1)$$

$R^1$ is a vinyl group, a phenyl group, an alkyl group having 1 to 8 carbon atoms or a fluoroalkyl group having 3 to 10 carbon atoms. Examples of the alkyl having 1 to 8 carbon atoms include methyl, ethyl and propyl groups. A typical example of the fluoroalkyl having 3 to 10 carbon atoms is 3,3,3-trifluoropropyl. More preferably, $R^1$ is vinyl or methyl. In the organopolysiloxane copolymer, the content of a vinyl group directly attached to a silicon atom should be 0.1 to 10%, preferably 0.5 to 5% by weight.

The organopolysiloxane copolymer (C) should contain a triorganosiloxy unit (M) of formula (1) and a $SiO_2$ unit (Q) in a molar ratio (M/Q) between 0.6 and 1.2, preferably between 0.7 and 1.1. If the triorganosiloxy unit (M) is in excess of this range, a composition prior to curing becomes viscous or sticky and less efficient to work with. If the amount of triorganosiloxy unit (M is below this range, an organopolysiloxane copolymer has a too high viscosity and is difficult to synthesize in a consistent manner because of an increased content of residual silanol. In addition to the main units (M) and (Q), the organopolysiloxane copolymer (C) may contain other units such as $R^1SiO_{3/2}$ and $R^1_2SiO_{2/2}$ units insofar as the objects of the invention are achievable.

The organopolysiloxane copolymer may be prepared by a well-known process, for example, simply by blending $R^1_3SiCl$ and $SiCl_4$ so as to provide a molar ratio as defined above, and effecting co-hydrolysis condensation.

Component (C) is blended in an amount of 5 to 50 parts, preferably 7 to 30 parts by weight per 100 parts by weight of component (A). On this basis, less than parts of component (C) achieves little improvement in tear strength and compression set whereas a composition containing more than 50 parts of component (c) is less efficient to extrude.

Component (D) is an organohydrogensiloxane containing at least three hydrogen atoms each directly attached to a silicon atom, that is, at least three $\equiv$SiH groups in a molecule. It serves as a crosslinking agent for the vinyl-containing organopolysiloxanes as components (A), (B), and (C). The position of a silicon atom to which a hydrogen atom is directly attached is not critical. Preferably, the organohydrogensiloxane has the following average compositional formula:

$$R_aH_bSiO_{(4-a-b)/2}$$

wherein R is a substituted or unsubstituted monovalent hydrocarbon group having 1 to 10, preferably 1 to 8 carbon atoms such as vinyl, phenyl, alkyl having 1 to 8 carbon atoms, and fluoroalkyl having 3 to 10 carbon atoms. Preferably, R is a methyl. Letter a is 0 or a positive number and letter b is a positive number. Preferably, $0 \leq a4$, $0<b<3$, and $0<a+b<4$.

The organohydrogensiloxane (D) is blended in a sufficient amount to provide 0.5 to 10 mol, preferably 1 to 7 mol of the hydrogen atom directly attached to a silicon atom per mol of the vinyl groups in components (A), (B) and (C) combined. On this basis, less than 0.5 mol of hydrogen atom is insufficient to induce hydrosilylation reaction. More than 10 mol of hydrogen atom is undesirable in that a cured product would be brittle and the excess SiH groups left therein can cause a change with time.

Component (E) is a platinum catalyst in the form of platinum or a platinum compound for hydrosilylation reaction. It is selected from well-known ones, for example, platinum black, platinum on silica, carbon black or the like, chloroplatinic acid, an alcohol solution of chloroplatinic acid, and complexes of chloroplatinic acid with olefins and vinylsiloxanes. It is used in a catalytic amount. More particularly, an amount of 0.0001 to 0.1 part by weight per 100 parts by weight of components (A), (B) and (C) combined is preferred for achieving a practical curing rate.

Component (F) is fine powder silica for imparting hardness, tensile strength and other mechanical strength to silicone rubber. It should have a specific surface area of at least 50 m$^2$/g, preferably 100 to 400 m$^2$/g. Examples of the silica which can meet this requirement include fumed silica, and precipitated silica alone or in admixture of two or more. Silica may be surface treated with coupling agents such as linear organopolysiloxanes, cyclic organopolysiloxanes, hexamethyldisilazane, and dichlorodimethylsilane.

Silica (F) is blended in an amount of 10 to 150 parts, preferably 20 to 100 parts, more preferably 40 to 80 parts by weight per 100 parts by weight of organopolysiloxane (A). Outside this range, silicone rubber has poor processability or low mechanical strength.

In addition to the above-mentioned essential components, the silicone rubber composition of the present invention may contain well-known additives which are conventionally blended in silicone rubbers. Exemplary additives are silica flour, diatomaceous earth, iron oxide, zinc oxide, titanium oxide, carbon black, barium oxide, magnesium oxide, cerium oxide, calcium carbonate, magnesium carbonate, zinc carbonate, asbestos, glass wool, finely divided mica, and fused silica powder. Also useful are agents for adjusting the rate of curing reaction or pot life-such as acetylene alcohols and hydroperoxides, dispersants such as silanol-containing low molecular weight siloxanes, alkoxysilanes and silazanes (e.g., tetramethylvinylsilane), pigments, dyes, antioxidants, antistatic agents, flame retardants such as antimony oxide and chlorinated paraffins, and heat transfer enhancers such as boron nitride and aluminum oxide.

The silicone rubber composition of the present invention can be prepared by uniformly mixing the above-mentioned essential and optional components in any desired mixer such as a roll mill, Banbury mixer and kneader. The order of blending the components is not critical. If the stability of a composition is important, it is preferred to mix components (A), (B), (C) and (F) and then add components (D) and (E) thereto.

The curable silicone rubber composition thus obtained can be extruded and cured with hot air (HAV). For example, by curing the composition at 80° to 400° C. for 5 seconds to 30 minutes and post baking for 0 to 20 hours, there can be obtained a silicone rubber. The resulting silicone rubber has a hardness of at least 60 on JIS A hardness scale, a 50% modulus of at least 10 kgf/cm$^2$, a tear strength of at least 15 kgf/cm, and a compression set of up to 15% when compressed at 100° C. for 22 hours. A silicone rubber having such physical properties is always available from a silicone rubber composition of the invention.

The silicone rubber is suitable as medical ultra-thin tubes and glass-holding gaskets because of high hardness and modulus. Additionally because of improved compression set, the silicone rubber is useful for forming building seal gaskets, facsimile machine rolls, automobile sealants and gaskets, silicone coated conductors, rubber contacts, nipples, unison joint boots, plug boots, and anode caps.

EXAMPLE

Examples of the present invention are given below by way of illustration and not by way of limitation. All parts are by weight.

First described are the components used in Examples and Comparative Examples.
Raw rubber (A1)
An organopolysiloxane raw rubber consisting of a dimethylsiloxy unit, a methylvinylsiloxy unit, and a dimethylvinylsiloxy unit and having a vinyl content of 0.054% by weight and a viscosity of 300,000 poise at 25° C.
Raw rubber (A2)
An organopolysiloxane raw rubber consisting of a dimethylsiloxy unit and a dimethylvinylsiloxy unit and having a vinyl content of 0.019% by weight and a viscosity of 300,000 poise at 25° C.
Oil (B1)
An organopolysiloxane oil consisting of a dimethylsiloxy unit and a dimethylvinylsiloxy unit and having a vinyl content of 1% by weight and a viscosity of 1 poise at 25° C.
Oil (B2)
An organopolysiloxane oil consisting of a dimethylsiloxy unit and a dimethylvinylsiloxy unit and having a vinyl content of 0.17% by weight and a viscosity of 50 poise at 25° C.
Resin (C1)
An organopolysiloxane copolymer consisting of a SiO$_2$ unit, a dimethylvinylsiloxy unit, and a trimethylsiloxy unit in a molar ratio of 1:0.12:0.94 and having a vinyl content of 2% by weight and a viscosity of 3.5 centistokes at 25° C. as measured in a 50% toluene solution.
Resin (C2)
An organopolysiloxane copolymer consisting of a SiO$_2$ unit, a dimethylvinylsiloxy unit, and a trimethylsiloxy unit in a molar ratio of 1:0.06:0.9 and having a vinyl content of 2.3% by weight and a viscosity of 5 centistokes at 25° C. as measured in a 50% toluene solution.
Resin (C3)
An organopolysiloxane copolymer consisting of SiO$_2$ unit and a trimethylsiloxy unit in a molar ratio of 1:09 and having a viscosity of 4 centistokes at 25° C. as measured in a 50% toluene solution.
Platinum catalyst
An octyl alcohol modified solution of chloroplatinic acid having a platinum concentration of 2% by weight.
Crosslinking agent
A methylhydrogenpolysiloxane blocked with a dimethylhydrogensiloxy group at each end of its molecular chain, containing 17 mol % of a methylhydrogensiloxane unit, and having a viscosity of 12 centistokes at 25° C.
Filler
Amorphous treated silica commercially available as Aerosil R-812 from Degussa Inc.
Dispersant
A dimethylpolysiloxane terminated with a silanol group at each end and having a viscosity of 20 centistokes at 25° C.

Examples 1–5 & Comparative Examples 1–2

A rubber compound was prepared by weighing the raw rubber, oil, resin, dispersant and filler in the amounts shown in Table 1, kneading them in a kneader, and heat treating at 150° C. for 2 hours.

To 100 parts of the rubber compound were added 0.2 part of the platinum catalyst, 0.05 part of ethynylcyclohexanol, and 6 parts of the crosslinking agent. The mixture was milled in a two-roll mill, press vulcanized at 170° C. for 10 minutes, and post cured at 200° C. for 4 hours. The resulting silicone rubber samples were measured for physical properties. The results are shown in Table 1.

In Example 6, the platinum catalyst, ethynylcyclohexanol, and the crosslinking agent were added to the rubber compound. In Comparative Example 4, the crosslinking agent and 2,5-dimethyl-2,5-bis(tert-butylperoxy)hexane were added to the rubber compound. Each mixture was milled in a two-roll mill and sheeted to a thickness of about 6mm. The sheet was subject to HAV in a dryer at 250° C. for 15 minutes. The HAV sheet was examined for the presence of bubbles. The results are shown in Table 2.

TABLE 1

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
| Composition (pbw) | Raw rubber (A1) | 100 | 80 | 40 | 80 | — | 20 | 100 | 100 | 100 |
|  | Raw rubber (A2) | — | 20 | 60 | 20 | 100 | 80 | — | — | — |
|  | Oil (B1) | — | — | 10 | 7 | 20 | — | — | — | — |
|  | Oil (B2) | 15 | 10 | — | — | — | — | — | — | 10 |
|  | Resin C1 | — | — | 10 | 7 | 20 | — | — | 15 | — |
|  | Resin C2 | 15 | 10 | — | — | — | — | — | — | — |
|  | Resin C3 | — | — | — | — | — | — | — | — | 10 |
|  | Filler | 65 | 70 | 75 | 75 | 75 | 75 | 85 | 75 | 75 |
|  | Dispersant | — | 1 | — | 1 | — | 20 | 15 | 10 | — |
| Physical Properties | Hardness, JIS A scale | 78 | 81 | 82 | 79 | 84 | 65 | 83 | 77 | 60 |
|  | Elongation, % | 380 | 390 | 430 | 400 | 500 | 700 | 110 | 270 | 430 |
|  | Tensile strength, kgf/cm$^2$ | 103 | 96 | 97 | 88 | 80 | 75 | 70 | 58 | 58 |
|  | Tear strength, kgf/cm | 21 | 22 | 29 | 24 | 43 | 40 | 8 | 12 | 12 |
|  | 50% modulus, kgf/cm$^2$ | 43 | 38 | 46 | 36 | 30 | 13 | 48 | 37 | 8 |
|  | Compression set (100° C., 22 hr.), % | 5 | 8 | 7 | 10 | 12 | 35 | 20 | 15 | 48 |

As is evident from Table 1, curable silicone rubber compositions within the scope of the present invention cure into silicone rubber samples having a satisfactory hardness, improved tensile and tear strength, high modulus, and acceptable compression set. As the result of visual observation of the sheet of comparative Example 3, granules which seemed as undissolved resins were found therein.

Comparative Example 3

To 100 parts of the rubber compound of Example 1 were added 6 parts of the crosslinking agent and 1.5 parts of a silicone oil paste of 50% 2,4-dichlorobenzoylperoxide. The mixture was milled in a two-roll mill, press vulcanized at 170° C. for 10 minutes, and post cured at 200° C. for 4 hours.

The resulting silicone rubber sample had the following physical properties.

| Hardness (JIS A scale) | 67 |
| --- | --- |
| Elongation | 550% |
| Tensile strength | 95 kgf/cm$^2$ |
| Tear strength | 28 kgf/cm |
| 50% modulus | 16 kgf/cm$^2$ |
| Compression set (180° C., 22 hr.) | 67% |

A comparison of these data with the results of Example 1 shows that the silicone rubber resulting from peroxide vulcanization is inferior in 50% modulus and compression set.

Example 6 & Comparative Example 4

A rubber compound was prepared by kneading the raw rubbers (A1) and (A2), oil (B2), resin (C2) and filler in the amounts shown in Table 1 in a kneader, and heat treating as in Example 1.

TABLE 2

|  |  | Example 6 | Comparativ Example 4 |
| --- | --- | --- | --- |
| Composition (pbw) | Raw rubber (A1) | 80 | 80 |
|  | Raw rubber (A2) | 20 | 20 |
|  | Oil (B2) | 10 | 10 |
|  | Resin (C2) | 10 | 10 |
|  | Filler | 67 | 67 |
|  | Platinum catalyst | 0.2 | — |
|  | Ethynylcyclohexanol | 0.05 | — |
|  | Crosslinking agent | 6 | 6 |
|  | 2,5-dimethyl-2,5-bis (tert-butylperoxy)hexane | — | 0.5 |
| HAV sheet |  | no bubbles | many bubbles |

It is seen from Table 2 that the peroxide vulcanizing composition is not suited for extrusion/hot air vulcanization molding.

There has been described a curable silicone rubber composition which is hot air vulcanizable into a silicone rubber having high hardness, high modulus, improved tear strength and improved compression set. Japanese Patent Application No. 99287/1994 is incorporated herein by reference.

While the invention has been described in connection with what is presently considered to be the most practical and preferred embodiment, it will be understood that the invention is not to be limited to the disclosed embodiment, but on the contrary, is intended to cover various modifications and equivalent changes included within the spirit and scope of the appended claims.

I claim:

1. A curable silicone rubber composition comprising, (A) 100 parts by weight of an organopolysiloxane containing 0.001 to 1% by weight of a vinyl group and having a viscosity of 1,000 to 1,000,000 poise at 25° C., (B) 5 to 50 parts by weight of an organopolysiloxane containing 0.1 to 10% by weight of a vinyl group and having a viscosity of 0.05 to 100 poise at 25° C., (c) 5 to 50 parts by weight of an organopolysiloxane copolymer mainly comprising a triorganosiloxy unit (M) of the general formula (1):

$$R^1{}_3SiO_{1/2} \qquad (1)$$

wherein $R^1$ is selected from the group consisting of a vinyl group, a phenyl group, an alkyl group having 1 to 8 carbon atoms, and a fluoroalkyl group having 3 to 10 carbon atoms and a $SiO_2$ unit (Q) in a molar ratio (M/Q) between 0.6 and 1.2 and containing 0.1 to 10% by weight of a vinyl group, (D) an organohydrogensiloxane containing at least three hydrogen atoms each directly attached to a silicon atom in a molecule in an amount to provide 0.5 to 10 mol of the silicon atom-attached hydrogen atom per mol of the vinyl groups in components (A), (B) and (C) combined, (E) a catalytic amount of a platinum catalyst, and (F) 10 to 150 parts by weight of finely divided silica having a specific surface area of at least 50 $m^2/g$.

2. The curable silicone rubber composition of claim 1 wherein the organopolysiloxane of component (A) has the following general formula (2):

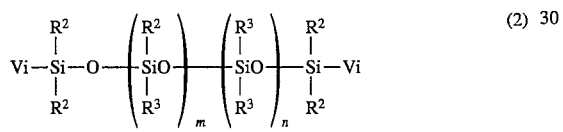

wherein Vi is vinyl, $R^2$ is a substituted or unsubstituted monovalent hydrocarbon group having 1 to 10 carbon atoms, $R^3$ is a substituted or unsubstituted monovalent hydrocarbon group having 1 to 8 carbon atoms and free of an aliphatic unsaturated group, and letters m and n are numbers such that the organopolysiloxane of formula (2) has a viscosity of 1,000 to 1,000,000 poise at 25° C. and a vinyl content of 0.01 to 1% by weight, and the organopolysiloxane of component (B) has the following general formula (3):

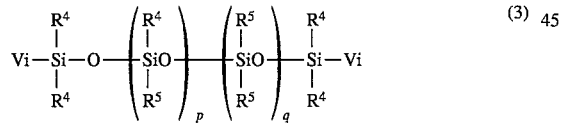

wherein Vi is vinyl, $R^4$ is a substituted or unsubstituted monovalent hydrocarbon group having 1 to 10 carbon atoms, $R^5$ is a substituted or unsubstituted monovalent hydrocarbon group having 1 to 8 carbon atoms and free of an aliphatic unsaturated group, and letters p and q are numbers such that the organopolysiloxane of formula (3) has a viscosity of 0.05 to 100 poise at 25° C. and a vinyl content of 0.1 to 10% by weight.

3. The curable silicone rubber composition of claim 1 which cures to a silicone rubber having a 50% modulus of at least 10 $kgf/cm^2$, a tear strength of at least 15 kgf/cm, and a compression set of up to 15% when compressed at 100° C. for 22 hours.

4. A method for preparing a silicone rubber comprising the step of curing the curable silicone rubber composition of claim 1 by hot air vulcanization.

5. The curable silicone rubber composition of claim 1, wherein component (A) has a viscosity of 10,000 to 1,000,000 poise at 25° C.

6. The curable silicone rubber composition of claim 1, wherein component (A) contains 0.002 to 0.2% by weight of vinyl groups.

7. The curable silicone rubber composition of claim 1, wherein component (A) contains optionally substituted $C_{1-10}$ monovalent hydrocarbon groups which are free of aliphatic unsaturated groups.

8. The curable silicone rubber composition of claim 7, wherein component (A) contains methyl, phenyl or 3,3,3-trifluoropropyl groups.

9. The curable silicone rubber composition of claim 2, wherein $R^2$ is a vinyl, phenyl, $C_{1-8}$-alkyl or $C_{3-10}$-fluoroalkyl group.

10. The curable silicone rubber composition of claim 2, wherein $R^2$ is methyl or vinyl and $R^3$ is methyl.

11. The curable silicone rubber composition of claim 1, wherein component (B) has a viscosity of 0.1 to 50 poise at 25° C.

12. The curable silicone rubber composition of claim 1, wherein component (B) contains 0.15 to 1.0% by weight of vinyl groups.

13. The curable silicone rubber composition of claim 1, wherein component (B) contains optionally substituted $C_{1-10}$-monovalent hydrocarbon groups which are free of aliphatic unsaturated groups.

14. The curable silicone rubber composition of claim 13, wherein component (B) contains methyl groups.

15. The curable silicone rubber composition of claim 2, wherein $R^4$ is a vinyl, $C_{1-8}$-alkyl or $C_{3-10}$-fluoroalkyl group.

16. The curable silicone rubber composition of claim 1, wherein $R^1$ is methyl, ethyl, propyl, 3,3,3-trifluoropropyl or vinyl.

17. The curable silicone rubber composition of claim 1, wherein the organopolysiloxane copolymer (C) contains 0.5 to 5% by weight of vinyl groups.

18. The curable silicone rubber composition of claim 1, wherein (M/Q) is 0.7 to 1.1.

19. The curable silicone rubber composition of claim 1, wherein the organohydrogenpolysiloxane (D) has the formula $R_aH_bSiO_{(4-a-b)/2}$, in which R is an optionally substituted $C_{1-10}$-monovalent hydrocarbon group, a is 0 or a positive number and b is a positive number.

20. A cured rubber composition produced from a composition of claim 1.

* * * * *